United States Patent Office 3,212,632
Patented Oct. 19, 1965

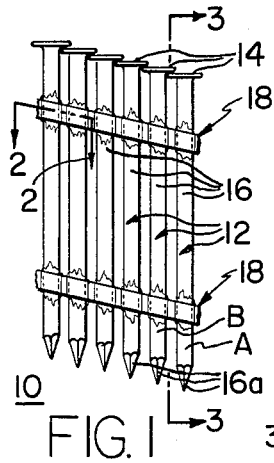
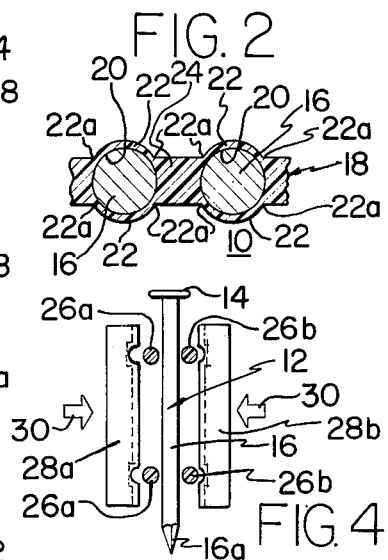
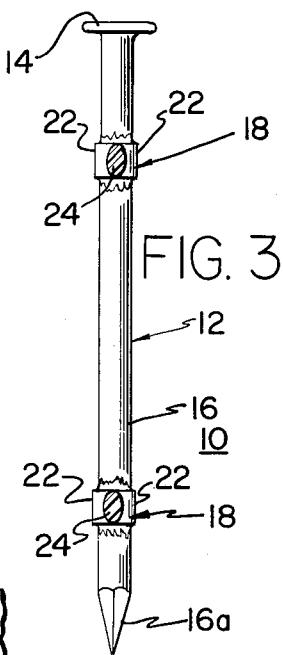
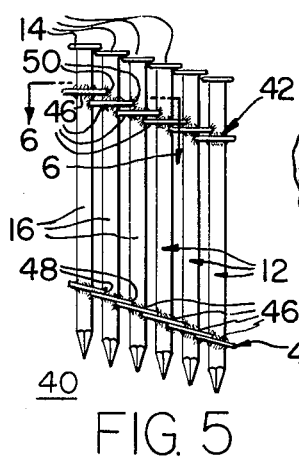
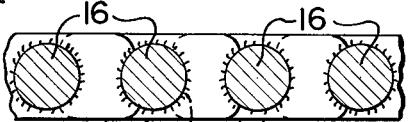
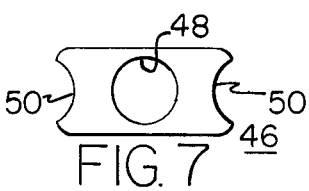
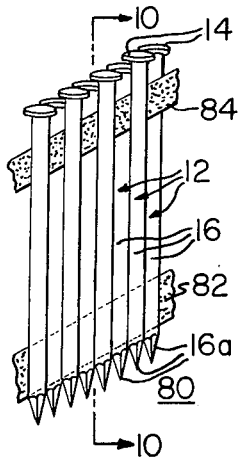
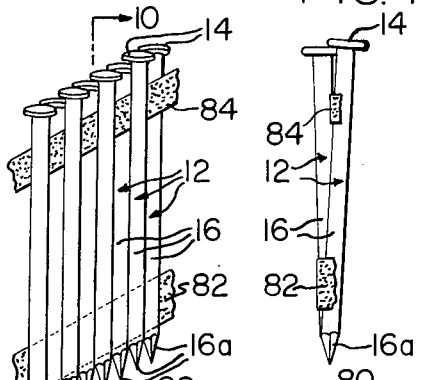
INVENTORS
WILLIAM H. BAUM
JOHN MOSETICH
ATTORNEYS

3,212,632
FASTENER ASSEMBLAGE
William H. Baum, Westchester, and John Mosetich, Elmhurst, Ill., assignors to Fastener Corporation, Franklin Park, Ill., a corporation of Illinois
Filed Oct. 3, 1963, Ser. No. 313,511
11 Claims. (Cl. 206—56)

The present invention relates to fasteners such as nails and the like which have been arranged and secured in strips for use in automatic fastener apparatus and to a method of making these strips.

With the advent of electrically and pneumatically operated fastener driving tools capable of driving larger fasteners, such as common nails, it is highly desirable and therefore an object of the present invention, to provide a new and improved strip or assemblage of fasteners in which each fastener is securely held in position in a carrier strip formed of flexible strip means but can be readily separated from the strip as it is driven by the driving blows of a fastener driving tool.

Another object of the present invention is the provision of a new and improved carrier strip of fasteners which is highly flexible yet strong and which can be inserted and coiled in the magazine of the fastener driving tool.

Yet another object of the present invention is the provision of a new and improved flexible carrier strip of fasteners in which the fasteners are secured with their shanks in side-by-side relation by means of flexible strips of material having portions of reduced cross-sections closely adjacent the shanks of the fasteners to facilitate severing of the carrier strip in this region as each fastener is driven.

Still another object of the present invention is the provision of a new and improved strip of fasteners in which the fasteners are positioned relative to one another so that the head of a driven fastener severs the portion of the flexible carrier strip holding the fastener as the fastener is driven.

Yet another object of the present invention is the provision of a new and improved method of forming a flexible carrier strip or assemblage of fasteners for use in fastener driving tools.

Still another object of the present invention is the provision of a new and improved method of forming flexible strips of fasteners for use in driving apparatus wherein strips of flexible plastic material are extended across the shanks of fasteners on opposite sides thereof and formed into a single integral flexible carrier strip holding the fasteners in place.

Yet another object of the present invention is the provision of a new and improved strip or assemblage of fasteners in which the fasteners are provided with a coating material for increasing the holding power of the fasteners in the material into which they are driven and are secured in a flexible carrier strip formed of material compatible with and bonded to the coating material on the fasteners.

Yet another object of the present invention is the provision of a new and improved method of forming a strip or assemblage of fasteners in which the fasteners are coated with a material for increasing the holding power of the fasteners in the material into which they are driven and are secured in a carrier strip formed of flexible material compatible with and bonded to said coating material.

The foregoing and other objects and advantages of the present invention are accomplished by the provision of a new and improved strip or assemblage of fasteners for use in fastener driving apparatus wherein the fasteners are arranged with their shanks in a side-by-side relation in which they are secured by a carrier strip of frangible material extended across the shanks. The carrier strip includes a plurality of spaced apart shanks receiving apertures along the length thereof having side walls. The side walls of the apertures are integrally joined together by interconnecting portions and are provided with segments immediately adjacent the interconnecting portions which are of a reduced cross-section to facilitate fracturing or severing the strip as each fastener is driven.

This strip of fasteners is formed by a new and improved method wherein the individual fasteners are positioned with their shanks in side-by-side relation and carrier strips of flexible plastic material are extended generally transverse to the shanks on both sides thereof. These opposed strips are formed together into a single continuous integral strip having spaced apart shank receiving apertures joined together with integral interconnecting portions by means of heat and pressure.

When it is desired to increase the holding power of the fasteners in the material into which they are driven, the fasteners are provided wtih a coating material on their surface which is compatible with the material of the carrier strip to form an integral bond therewith.

In another embodiment of the present invention, the strip means are formed of frangible washers having shank receiving central apertures and a pair of shank abutting surfaces at opposite ends thereof. The fastener shanks are adhesively secured in the shank receiving apertures and the shank abutting surfaces are adhesively secured to adjacent fastener shanks forming a strip of fasteners arranged with their shanks in side-by-side relation.

Another embodiment of the present invention includes continuous strip means formed of adhesively coated tape having a plurality of shank receiving apertures or perforations extending along the central longitudinal axis thereof and extending flank portions on both sides of the perforations. The fastener shanks are inserted through the perforations to lie in side-by-side relation, and the flank portions are folded to lie against and are adhesively secured to the sides of the shanks to secure the fasteners to the tape.

Yet another embodiment of the present invention includes a strip of fasteners positioned with their shanks in side-by-side relation with the lower ends thereof abutting one another. Strip means having adhesively coated opposite sides extend transversely across the shanks with the fasteners arranged so that adjacent shanks thereof are alternately secured to first one side of the strip means and then the other. The lower abutting ends of the shanks are also secured together.

It is to be understood that in all of the embodiments described above the fasteners may be coated with material for increasing the holding power of the fasteners in the material into which they are driven. The coating material is compatible with and forms an integral bond with the frangible washers, coated tape and the adhesive strip means of these various embodiments as the strips are formed.

For a better understanding of the present invention reference should be had to the following detailed description taken in conjunction with the drawings, in which:

FIG. 1 is a fragmentary side elevational view of a new and improved strip of fasteners embodying the present invention;

FIG. 2 is a sectional view taken substantially along the line 2—2 of FIG. 1;

FIG. 3 is an enlarged sectional view taken substantially along the line 3—3 of FIG. 1;

FIG. 4 schematically illustrates the new and improved method of assembling the strip of fasteners shown in FIG. 1;

FIG. 5 is a fragmentary side elevational view of another embodiment of a new and improved strip of fasteners of the present invention;

FIG. 6 is an enlarged sectional view taken substantially along line 6—6 of FIG. 5;

FIG. 7 is an enlarged detail view of a washer-like member included in the strip of fasteners shown in FIGS. 5 and 6;

FIG. 8 is a fragmentary perspective view of another embodiment of a new and improved strip of fasteners of the present invention;

FIG. 9 is a fragmentary side elevational view of another embodiment of a new and improved strip of fasteners of the present invention; and FIG. 10 is a sectional view taken substantially along line 10—10 of FIG. 9.

Referring now more particularly to the drawings, there is illustrated in FIGS. 1–3 a new and improved strip or assemblage of fasteners which is constructed in accordance with the present invention and which is indicated generally by the reference numeral 10. The assemblage 10 includes a plurality of individual fasteners such as common nails 12 having heads 14 and depending shanks 16 with pointed lower ends 16a. The nails 12 are arranged with their shanks 16 in parallel side-by-side relation and are spaced apart a distance determined by the size of the heads 14. Each head 14 is arranged so that one edge thereof touches the shank 16 of the adjacent nail 12 and so that the top surface thereof underlies a portion of the lower surface of the head of this adjacent nail. The nails 12 are arranged as described so that as the first nail "A" of the strip 10 (FIG. 1) is driven downwardly by a drive member of a fastener driving apparatus, the head 14 thereof will move downwardly and the left-hand edge thereof will touch or scrape along the right-hand edge of the second nail "B" in the strip. This action is desirable in order that the head 14 of each nail 12 as it is driven, will shear off the means holding the nail to the strip 10 of the nails.

In order to secure the nails 12 in the position shown in FIG. 1 to form the strip 10, there is provided a pair of parallel and vertically spaced flexible plastic carrier strips 18 which extend generally transversely across the shanks 16 of the nails below the heads 14 thereof. These carrier strips 18 are preferably formed of a thermoplastic resin such as a vinyl resin (e.g., polyvinyl chloride) which is strong, light, and flexible and can be readily molded by heat and pressure into the desired shape.

Preferably, the nails 12 are covered with a coating material for increasing the holding power of the nails in the material into which they are driven. The coating material should be compatible with the material of the strips 18 in order to form a bond therewith as the strips are secured to the nails. Several coating materials have been used successfully with strips 18 made of polyvinyl chloride. One such coating material consists of 25% polyvinyl chloride resin, toluene 37½% and 37½% acetone. Another coating material consists of the combination of 24% polyvinyl chloride, 38% high boiling chlorinated hydrocarbon and 38% high boiling ketone solvent. The former coating material has a flash point of approximately 30° F. and the latter a higher flash point of approximately 130° F. The coating material may be applied to the fasteners 12 by appropriate means such as tumbling in a hopper, wiping, spraying or rolling, and it has been found that either of the coating materials described bonds well with strips 18 composed of extruded polyvinyl chloride material made from a combination of phthalate and monomeric epoxy plasticizer with a barium cadmium laurate stabilizer system. The strips 18 formed of this material can be suitably molded at temperatures in the range of 280° to 310° F. and when the material solidifies and is at room temperature it has a durometer hardness (A-scale) of 80. It is to be understood that various other types of flexible plastic materials can be used for forming the carrier strips 18.

Each of the strips 18 is formed with a plurailty of spaced shank receiving apertures 20 (FIG. 2) having side walls 22 forming the circular apertures to receive the shanks 16 of the nails. The strip 18 also includes portions 24 which are interconnected to the circular side walls 22 to form an integral continuous strip. The side walls 22 are formed with segments 22a adjacent the region of interconnection of the side walls 22 and the interconnecting portions 24 of the strips 18. These segments 22a are of reduced cross-sectional area to facilitate the shearing or fracturing of the strip 18 at these regions by the head 14 of the nail 12 as it is driven.

In forming the strip 10 of fasteners, the individual nails 12 are positioned with their shanks 16 arranged in parallel side-by-side relation with their heads 14 arranged as illustrated in FIG. 1. The nails may be precoated as before described in a tumbling hopper or can be coated after they are aligned by means of rollers, wiping pads or sprays. Two pairs of strips 26a and 26b of flexible plastic material, such as polyvinylchloride, are positioned to extend across the shanks 16 of the positioned nails on opposite sides thereof as indicated in FIG. 4. Two dies 28a and 28b having cavities defined therein to accommodate the nail shanks 16 and cavities which are shaped to form the strips 26a and 26b together into the single integral carrier strip 18 of the configuration described are moved together in the direction of the arrows 30. Sufficient heat and pressure is applied to the dies 28a and 28b to mold the pairs of opposed strips 26a and 26b into single integral carrier strip 18 of the configuration described, with the nails 12 firmly secured therein. The heat and pressure form a tight bond between the coating on the nails and the formed carrier strip 18 so that the nails will not slip in the apertures 20 therein. The strips 26a and 26b may be heated by appropriate means such as heat lamps to temperatures in the range of 280°–310° F. as they are extended along the shanks of the nails in order to obtain a good bond with the coated nails and between the two strips forming the integral carrier strip 18. The opposed cavities in the dies 28a and 28b force the opposed pairs of strips 26a and 26b together so that the nail shank receiving apertures 20 are formed with the side walls 22 having reduced cross-sectional segments 22a and the interconnecting portions 24 are integrally formed therewith. When the molding process has been completed, the dies 28a and 28b are then opened to allow the completed nail strip 10 to be removed.

The completed strip 10 is then ready for use in the magazine of a nail driving apparatus. As each nail 12 of the strip 10 is driven, the head thereof shears the flexible strips 18 at the segments 22a which are small in cross-section, and the fragmentary portions of these strips fall away. It has been found that because of the bond obtained between the coating on the nails and the carrier strip 18 that when the strip is severed during driving of the nails 12 particles of the strip which are broken away are relatively large and not subject to chipping and flying off the gun as is the case with other types of material. Moreover, should portions of the strip 18 remain on the nail shank 16 as the nail is driven because of the bond, the holding power of the nail in the material into which it is driven is further increased. It has been found that strips 18 formed of polyvinylchloride work well since they are extemely flexible yet strong and do not "gum up" the driving apparatus since the reduced cross-sectional segments 22a provide for even shearing and ragged tearing of the strips is uncommon.

Referring now to FIGS. 5 and 6 of the drawings, there is illustrated another embodiment of a strip of fasteners constructed in accordance with the present invention and indicated generally by the reference numeral 40. The strip 40 is composed of a plurality of fasteners, such as the coated nails 12, arranged with their heads 14 and shanks 16 in the arrangement described above.

The nails 12 of the strip 40 are secured in position by strip means such as an upper strip 42 and a lower strip 44. Each of the strips 42 and 44 is comprised of a plurality of washer-like members 46 (FIG. 7) formed of frangible material such as flexible plastic. Each of the washer-like members 46 is provided with a central shank receiving aperture 48 and a pair of opposed shank abutting surfaces 50. The shanks 16 of the nails 12 are inserted in the apertures 48 of the members 46 and adhesive is applied to secure the shank therein. The adhesive used is of the type compatible with and bondable to the coating material on the nails and the washer-like members 46. The nails with members 46 thus secured thereon are arranged as shown in FIG. 5 with the surfaces 50 of the members 46 abutting the shanks of adjacent nails 12, and adhesive is applied to the surfaces 50 to secure adjacent nails together to form the completed strip 40. In the strip 42, the top and bottom surfaces of the members 46 on adjacent nails are spaced from each other by an amount approximately equal to the thickness of the nail heads 14, and the individual members 46 are arranged to lie in vertically spaced planes normal to the shanks 16. In the strip 44, the top and bottom surfaces of the members 46 on adjacent nails are arranged to overlie one another and are secured together by adhesive material.

Referring now to FIG. 8, there is illustrated another embodiment of a strip of nails in accordance with the present invention indicated generally by the reference numeral 60. The strip 60 is comprised of a plurality of coated nails 12 arranged with the heads 14 and the shanks 16 thereof positioned in the same manner as the nails of the strip 10. The nails 12 of the strip 60 secured in proper arrangement by means of two tapes 62 extending generally transverse to the shanks 16 of the nails. The tapes 62 are provided with a plurality of shank receiving spaced apart apertures 64 aligned along the central longitudinal axis of the tape. On both sides of the central line of apertures 64, there are provided adhesive coated flank or flange portions 66 which are folded upwardly or downwardly, to lie against the sides of the shanks 16 after the nails 12 have been inserted into the apertures 64 of the tapes 62. The tapes 62 are preferably formed of thin flexible plastic material such as polyvinylchloride, and an adhesive is used which is compatible with and bondable to the coating material on the nails in order to form a strong bond between the tapes 62 and the nails.

Another strip embodying the present invention is illustrated in FIGS. 9 and 10 and is indicated by the reference numeral 80. The strip 80 includes a plurality of fasteners, such as the coated nails 12, having heads 14 and shanks 16 with pointed lower ends 16a. The pointed ends 16a of the nails 12 of the strip 80 are secured closely adjacent one another by an adhesive coated strip 82 disposed along one side of the shanks 16. The upper ends of the shanks 16 adjacent the heads 14 are staggered to accommodate a centrally located strip 84 having its opposite sides coated with an adhesive. The adhesive material used is compatible with and bondable to the coating material on the nails in order to form a strong integral strip. The shanks 16 of alternate nails 12 are secured to one of the opposite sides of the strip 84 as is illustrated.

While it is generally preferable to have coated fasteners because of their increased holding ability, it is within the scope of the present invention to provide strips of fasteners as described wherein the fasteners are not coated or are only partially coated in the regions where the various strip means are assembled. It is also to be understood that while the various embodiments illustrated in the drawings show the head of each fastener overlying a portion of the head of an adjacent fastener, it is within the scope of the present invention to arrange the fasteners with their shanks in spaced apart parallel relation with the heads lying along a common plane and the edges thereof touching one another or closely adjacent. The specific arrangement of the fasteners of a strip will depend upon the type of magazine assembly of the fastener driving apparatus.

While the present invention has been described in connection with details of illustrative embodiments, these details are not intended to be limitative of the invention except as set forth in the accompanying claims.

What is claimed as new and desired to be secured by United States Letters Patent is:

1. A strip of fasteners of the type having enlarged heads and depending shanks for use in fastener driving apparatus comprising means for securing said fastener shanks in side-by-side relation including a plurality of washers formed of frangible material, each washer having a shank receiving aperture and a pair of shank abutting surfaces on opposite ends thereof, said shanks extending through the apertures of and being adhesively secured to said washers, the opposite abutting surfaces thereof being adhesively secured to the shanks of adjacent fasteners.

2. Apparatus as defined in claim 1 wherein washers on adjacent shanks are positioned to abut and overlie one another.

3. Apparatus as defined in claim 1 wherein said fasteners are positioned so that a top surface of one fastener head closely underlies a portion of an adjacent head and wherein adjacent washers are normal to the shanks and spaced apart from one another the approximate thickness of a fastener head.

4. A strip of fasteners of the type having enlarged heads and depending shanks for use in fastener driving apparatus comprising continuous strip means extending generally transverse to said shanks for securing said shanks in side-by-side relation, said strip means including a strip of tape having a plurality of spaced apart shank receiving perforations therein extending along a central longitudinal axis of said tape, said tape including side flank portions on both sides of said perforations, said shanks extending through said perforations and said flank portions being folded to lie against the sides of said shanks and being adhesively secured thereto.

5. Apparatus as defined in claim 4 wherein said fasteners are positioned so that a top surface of one fastener head closely underlies a portion of an adjacent head and wherein said strip means includes two strips of said perforated tape arranged in parallel spaced apart relation.

6. A strip of fasteners of the type having enlarged heads and depending shanks for use in fastener driving apparatus, said fasteners being arranged with their shanks in side-by-side relation with the lower ends thereof abutting one another and the heads thereof adjacent one another, means for securing said fasteners in said side-by-side relation comprising a strip of material having a pair of adhesive coated opposite sides, said shanks positioned so that adjacent shanks are alternately secured to said strip first on one coated side and then the other, and means for securing the lower ends of adjacent nail shanks in abutting contact with one another.

7. In combination, a plurality of fasteners arranged with their shanks in spaced and parallel relation; and strip means extending transversely across said shanks for holding said fasteners in said spaced and parallel relation, said strip means comprising a continuous length of flexible, thermoplastic material shaped to define wall means forming a plurality of spaced-apart, shank-receiving apertures and including a plurality of spacing segments integrally joining said wall means of adjacent apertures, said segments disposed directly between and aligned with the shanks of adjacent fasteners and having a transverse thickness substantially greater than that of said wall means and at least as great as one half of the diameter of said shanks for a substantial part of the distance between adjacent shanks to maintain the shanks parallel to each other.

8. In combination, a plurality of fasteners arranged with their shanks in spaced and parallel relation; and a pair of spaced, parallel strip means extending transversely across said shanks for holding said fasteners in said spaced and parallel relation, each of said strip means comprising a continuous length of flexible, thermoplastic material shaped to define wall means forming a plurality of spaced-apart, shank-receiving apertures and including a plurality of spacing segments integrally joining said wall means of adjacent apertures, said segments disposed directly between and aligned with the shanks of adjacent fasteners and having a transverse thickness substantially greater than that of said wall means and at least as great as one half of the diameter of said shanks for a substantial part of the distance between adjacent shanks, segments of each of said strip means being substantially equal in length to one another to maintain the parallel alignment of adjacent shanks.

9. Apparatus as defined in claim 7 wherein said strip means is formed of a pair of longitudinal strips of flexible, thermoplastic material extending across said shanks on opposite sides thereof, said strips being molded together intermediate said shanks to integrally form said spacing segments.

10. In combination, a plurality of fasteners arranged with their shanks in spaced relation, a layer of coating material covering at least a portion of the shanks, and strip means extending transversely across said shanks for holding said fasteners in said spaced relation, said strip means comprising a continuous length of flexible, thermoplastic material shaped to define wall means forming a plurality of spaced-apart, shank-receiving apertures and including a plurality of spacing segments integrally joining said wall means of adjacent apertures, the strip means being positioned on the fasteners so that the coated portions at the shanks are received in the shank-receiving openings, and the coating material having the characteristic that it adheres to or forms a bond with the thermoplastic material of the strip means.

11. In combination, a plurality of fasteners arranged with their shanks in spaced relation and coated with a plastic material; and strip means extending transversely across said shanks for holding said fasteners in said spaced relation, said strip means comprising a continuous length of flexible, thermoplastic material compatible for heat and pressure bonding with said plastic material and shaped to define wall means forming a plurality of spaced-apart, shank-receiving apertures and including a plurality of spacing segments integrally joining said wall means of adjacent apertures, said segments disposed directly between the shanks of adjacent fasteners.

References Cited by the Examiner

UNITED STATES PATENTS

| | | | |
|---|---|---|---|
| 665,989 | 1/01 | Bechtold | 18—59 |
| 730,960 | 6/03 | Pope | 1—56 X |
| 1,547,399 | 7/25 | Kaufmann et al. | 18—59 |
| 2,724,303 | 11/55 | Holcomb | 1—56 X |
| 2,909,781 | 10/59 | Ollig et al. | 1—56 |
| 2,927,324 | 3/60 | Ollig et al. | 1—56 X |
| 3,082,425 | 3/63 | Leslie | 1—56 |
| 3,083,369 | 4/63 | Peterson | 1—56 |

GRANVILLE Y. CUSTER, JR., *Primary Examiner.*